Feb. 16, 1926.
E. J. WATTS
PEN FOR RECORDING GAUGES
Filed June 28, 1920
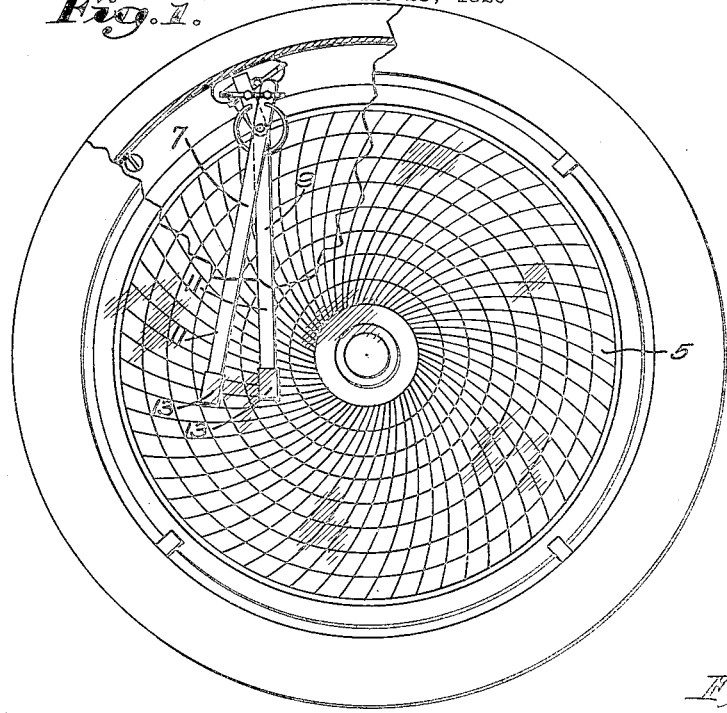
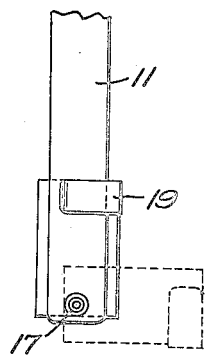
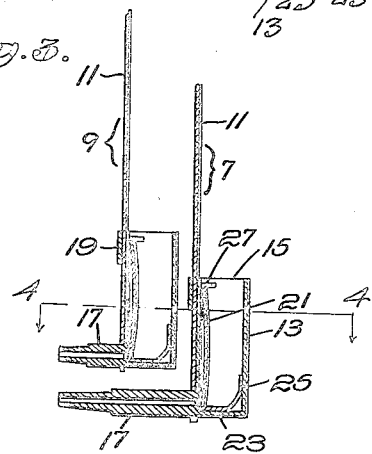
Inventor:
Edward J. Watts
By Emery, Booth, Janney & Varney
Attys Patented Feb. 16, 1926.

1,573,339

UNITED STATES PATENT OFFICE.

EDWARD J. WATTS, OF FOXBORO, MASSACHUSETTS, ASSIGNOR TO THE FOXBORO COMPANY, OF FOXBORO, MASSACHUSETTS, A CORPORATION OF MASSACHUSETTS.

PEN FOR RECORDING GAUGES.

Application filed June 28, 1920. Serial No. 392,220.

*To all whom it may concern:*

Be it known that I, EDWARD J. WATTS, a citizen of the United States, and a resident of Foxboro, county of Norfolk, and State of Massachusetts, have invented an Improvement in Pens for Recording Gauges, of which the following description, in connection with the accompanying drawings, is a specification, like characters on the drawings representing like parts.

This invention relates to pens and particularly aims to provide a pen suitable for use on a recording instrument of the pressure gauge type. While not limited in its use thereto, the pen constructed in accordance with the principles of my invention, which is shown as an illustrative embodiment in the accompanying drawings, is more particularly adapted for use in instruments having more than one pen.

The principles of my invention may be readily understood from the following description of one specific form thereof shown by way of example in the accompanying drawings, wherein:

Fig. 1 is a front elevation of a recording instrument having two pens;

Fig. 2 is a view of the end of the hand and the pen proper as seen from the dial side;

Fig. 3 is a central vertical section through two pens mounted as shown in Fig. 1 but hanging in alignment, and Fig. 4 is a section on the line 4—4 of Fig. 3.

Referring to the drawings, I have shown in Fig. 1 an instrument, such, for instance, as a hygrometer, having a rotary chart 5. Across this chart from the center to one side swing the pens 7 and 9 about the same axis at the side of the chart. In the case of a hygrometer one of these pens would record the dry bulb temperature and the other the wet bulb temperature. As shown in Fig. 3, the pen 9 must be free to pass directly under the pen 7 and the marking points should mark on the chart 5 as close together as possible. In practice the arms of the pens may be somewhat bent to bring the points together but I have not attempted to show this in the drawings as I believe that it would somewhat confuse the disclosure.

The pens 9 and 7 are of substantially similar construction and each embodies a hand or arm 11 which carries at its end the pen proper. Referring to Fig. 3, the pen proper may embody an ink reservoir 13 which I prefer to form with flat sides at the front and back for a purpose hereafter to be explained and which conveniently may take the form of a parallelopiped having an open top end 15. The height and width of the parallelopiped measured parallel to the chart may vary in accordance with the desired capacity of the reservoir. From one of the flat sides adjacent the opposite end projects the hollow stylus or marking point 17, the length of which varies in accordance with the distance of the arm 11 from the chart as shown in Fig. 3. The bore of the stylus communicates with the interior of the reservoir 13 as shown in Fig. 3.

To secure the pen to the arm 11 the latter may have adjacent its end an opening through which the stylus 17 may be inserted and the reservoir 13 may also be provided with a clip-like arm 19 overlying the flat face from which the stylus projects and open at one side, the arm 11 being adapted to be received between the face of the reservoir and the clip 19. To assemble the pen the stylus 17 is pressed through the aperture in the arm 11 with the reservoir in the dotted line position of Fig. 2. It may then be swung around to the full line position thereby causing the arm 11 to enter underneath the clamp and the pen will be securely held in position as will be well understood.

A suitable feeder may be provided within the reservoir 13 for delivering the ink to the bore of the stylus 17. In the form of invention shown this feeder may be bent from a single strip of light metal providing a portion 21 which lies along the inner side of that wall of the reservoir from which the stylus projects. This portion 21 is conveniently bent at a curve to offset the central portion from the ends thereof and thus provide between the same and the wall a capillary channel for retaining ink and feeding it to the bore of the stylus 17. The lower end of the strip may be bent to provide a foot 23 fitting the bottom of the reservoir and a rebent resilient arm 25 which makes contact with the opposite wall thereof. The arm 25 is somewhat compressed when the feeder is inserted and thus the feeder is held securely in position. The opposite end of the strip may be provided with a short angular end portion 27 providing a convenient grip by which the feeder strip may be withdrawn when desired.

The construction just described provides for holding a large supply of ink and for feeding it properly to the marking point. The construction of the reservoir as a flat-sided, box-like structure permits two or more pens to be used in the manner shown in Fig. 1 and Fig. 3 with the points close together and the hands closely adjacent each other, the outer pen swinging across the flat top of the inner pen with minimum clearance and the inner pen likewise swinging above the stylus 17 of the outer pen with slight clearance. While the flat-sided structure herein illustrated is preferred for reasons set forth, in referring in the appended claims to the ink reservoir as box-like I do not necessarily imply the parallelopipedal form shown but refer to a container of relatively large capacity and in the nature of a cup or box.

Having described in detail the particular form of my invention shown by way of example in the accompanying drawings, the principles exemplified thereby which I claim as new and desire to secure by Letters Patent I shall express in the following claims.

Claims:

1. A pen for recording gauges and the like and adapted particularly for multiple pen instruments comprising a reservoir having an open end and opposed flat sides and a stylus projecting from one of said sides remote from said open end, the whole providing a pen of relatively great ink capacity yet restricted depth whereby it may swing freely between a chart and instrument cover or in cooperation with other pens.

2. A pen for recording gauges and the like and adapted particularly for multiple pen instruments comprising an open ended reservoir having a flat side, a stylus projecting from said side remote from the open end and a strip-like arm engaging said flat side and secured to the reservoir to support the same.

3. A pen for gauges or the like comprising an ink-containing reservoir, a stylus projecting from the reservoir adjacent the bottom thereof and having a bore opening through the wall of the reservoir to permit gravitation of ink from the reservoir to said bore and feeder means in the reservoir controlling the flow of ink to the bore.

4. A pen for gauges or the like comprising an ink-containing reservoir, a stylus projecting from the reservoir adjacent the bottom thereof and having a bore opening through the wall of the reservoir and a removable device in the reservoir cooperating with the wall thereof to control the flow of ink to said bore.

5. A pen as described comprising a hand having an opening and a pen proper including a reservoir, a stylus projecting therefrom and received in said opening and an open sided clip on the reservoir engaging the hand.

6. A pen comprising a box-like reservoir, a stylus projecting laterally from a face thereof and having a bore communicating with the reservoir and a clip overlying that face of the reservoir from which the stylus projects and adapted to be engaged with a hand.

7. A pen comprising a box-like reservoir, a stylus projecting therefrom and a feeder providing in cooperation with a wall of the reservoir a capillary channel to the stylus, said feeder having a resilient portion and being held in position by compression of said portion within the reservoir.

8. A pen comprising a box-like reservoir, a stylus projecting therefrom and a feeder comprising a strip bent to provide a curved portion to lie along one wall and an extension to engage the opposite wall.

9. A pen comprising a box-like reservoir, a stylus projecting therefrom and a feeder having a portion lying along one wall and providing a capillary channel to the stylus and a yielding portion interposed between said first portion and the opposite wall.

10. The feeder for a pen as described comprising a strip having a main portion centrally offset relatively to the ends, a short angularly projecting end portion and a long rebent end portion.

11. A pen comprising a hand and a pen proper comprising a box-like ink reservoir having a stylus projecting laterally therefrom, said hand being shaped to engage said stylus to support the pen proper with the reservoir lying along the side of the hand.

In testimony whereof, I have signed my name to this specification.

EDWARD J. WATTS.